US008677870B2

(12) United States Patent
Winkler

(10) Patent No.: US 8,677,870 B2
(45) Date of Patent: *Mar. 25, 2014

(54) PROTECTIVE SYSTEM FOR MACHINE TOOLS

(75) Inventor: Thomas Winkler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 70 days.

This patent is subject to a terminal disclaimer.

(21) Appl. No.: 12/736,228

(22) PCT Filed: Nov. 19, 2008

(86) PCT No.: PCT/EP2008/065781
§ 371 (c)(1),
(2), (4) Date: Dec. 6, 2010

(87) PCT Pub. No.: WO2009/121429
PCT Pub. Date: Oct. 8, 2009

(65) Prior Publication Data
US 2011/0100177 A1 May 5, 2011

(30) Foreign Application Priority Data

Mar. 31, 2008 (DE) .................. 10 2008 000 891

(51) Int. Cl.
*B26D 7/22* (2006.01)
*F16D 51/16* (2006.01)
*F16P 3/00* (2006.01)

(52) U.S. Cl.
USPC .............................. 83/58; 192/129 R; 188/78

(58) Field of Classification Search
USPC ....... 83/58, 62; 192/129 R; 188/78, 188, 186, 188/184, 185, 189, 180
See application file for complete search history.

(56) References Cited

U.S. PATENT DOCUMENTS

| RE19,230 E | * | 7/1934 | Apple | 188/156 |
| 2,047,556 A | * | 7/1936 | Harvey | 188/335 |
| 2,388,946 A | * | 11/1945 | Beall | 188/184 |
| 2,808,905 A | * | 10/1957 | Bohl | 188/184 |
| 3,469,313 A | * | 9/1969 | Martin | 30/122 |
| 3,533,357 A | * | 10/1970 | Brandon | 104/113 |
| 3,576,242 A | * | 4/1971 | Mumma | 193/35 A |
| 3,858,095 A | * | 12/1974 | Friemann et al. | 192/129 A |
| 4,531,617 A | | 7/1985 | Martin et al. | |
| 5,105,925 A | | 4/1992 | Tremaglio et al. | |

FOREIGN PATENT DOCUMENTS

| CN | 87 1 04385 | 2/1988 |
| CN | 101063302 | 10/2007 |
| DE | 2 147 669 | 4/1972 |
| DE | 87 08 955 | 12/1987 |
| DE | 195 36 995 | 4/1997 |
| SU | 775469 | 10/1980 |
| SU | 1137265 | 1/1985 |

* cited by examiner

*Primary Examiner* — Ghassem Alie
(74) *Attorney, Agent, or Firm* — Kenyon & Kenyon LLP

(57) ABSTRACT

An emergency braking system for abruptly braking a revolving shaft of a machine tool for protecting a user of the machine tool includes a brake drum which may be engaged with at least one brake shoe in order to brake the shaft. The brake drum and the at least one brake shoe are configured in such a way that the braking engagement between the brake drum and the brake shoe takes place under the influence of a centrifugal force or centrifugal acceleration resulting from the rotation of a shaft.

8 Claims, 2 Drawing Sheets

PROTECTIVE SYSTEM FOR MACHINE TOOLS

BACKGROUND OF THE INVENTION

1. Field of the Invention

The present invention relates to a protective system for a machine tool, e.g., a circular saw, which develops its protective effect within a very short time period, which is generally in the range of several milliseconds, in order to protect a user of the machine tool from injuries in hazardous situations.

2. Description of Related Art

At the present time there are essentially three different approaches for implementing such a protective system for table and format circular saws, which are intended to prevent a user from coming into contact with the revolving saw blade or incurring a serious cut injury.

The protective system of a U.S. manufacturer, provided and marketed under the company name SawStop Inc., is an emergency braking system which allows the machine tool to be braked as the result of a direct intervention in the saw blade by a braking actuator system as soon as an appropriately designed sensor has detected a hazardous situation. Using a hot-wire triggering device, a rotatably mounted aluminum block is pushed into the toothing of the running saw blade with the aid of a pretensioned spring, the aluminum block becoming wedged therein and thus absorbing the rotational energy of all geometries of the machine tool which are revolving during the sawing operation. As a side effect, this one-sided application of force on the cutting edges is used to lower the saw blade into the saw table, using a specially designed suspension situated on the saw table. With the aid of this system it is possible to avert serious bodily injury to the operator of the machine tool who triggers the protective mechanism. A disadvantage is the direct action on the machining tool, i.e., on the cutting geometry of the saw blade, since additional hazard potential for the operator results when parts of the toothing break off. Furthermore, restoring the operability of the protective system requires replacement of the brake unit, including the saw blade, with a replacement unit which is ready for use, and which the operator must have in stock in order to allow continued operation after a braking operation has taken place using the protective function. This entails significant consequential costs and a corresponding time expenditure for the procurement and installation. In addition, it may be assumed that all components affected by the braking operation, i.e., all revolving geometries of the machine tool, are subjected to severe stresses during the deceleration phase. Neither the manufacturer nor applicable publications pertaining to this system provide data concerning the fatigue strength of the unit.

Another approach involves the use of a protective system exclusively for lowering the saw blade into the saw table without initiating a braking operation of the saw blade. With the aid of a pyrotechnic ignition charge, the saw blade including the main shaft and its bearing are removed from the hazard zone, thus allowing severe injury to the operator to be prevented. A disadvantage of this type of protective system is the necessity of moving relatively large masses, in the form of the systems to be lowered, under severe time constraints in the millisecond range. The pyrotechnic ignition devices necessary for this purpose, which have proven to be indispensable for this protective actuator system, also result in costly partial reversibility, which limits immediate resumption of operations of the machine tool including a protective system which is ready for use, and also imposes time-related and organizational constraints. In addition, due to space limitations and a very specific operating procedure, this protective system is suitable only for fairly large stationary equipment, for example circular table saws, which allow such a design in their interior. In contrast, this system is ruled out for use on smaller hand-operated devices such as compound miter saws and miter saws, for example.

A disclosure from a publicly funded project named "Cut-Stop" (VDI/VDE/IT) regarding a protective system for format circular saws from the Institut für Werkzeugmaschinen (IFW) [Institute for Machine Tools], University of Stuttgart, describes an approach which, using a special shape of a disk brake system, namely, a self-amplifying wedge brake, brings the main shaft of the machine tool, and thus the saw blade, to a standstill. With the aid of a pyrotechnic ignition device, a wedge is accelerated and subsequently pushed between a stationary wedge guide, in the form of a modified brake caliper, and the rotating brake disk. The system acts in a self-locking manner for the selection and combination of specific wedge angles $\alpha$ and brake lining values $\mu$, so that, using this design, the particular time demands on the braking operation may be met as a function of the mass inertia to be decelerated. However, as described in the cited publication, the disadvantage of this protective system is that subsequent to the triggering of the protective actuator system it is necessary to replace the complete brake unit due to the wedge which gets jammed in the friction pairing. The time required for carrying out this operation is approximately 10-12 minutes for complete restoration of system operability. Thus, here as well, there is partial limitation of the immediate system reversibility.

On the basis of this related art, it is an object of the present invention to provide a protective system for a machine tool having an alternative design which develops its protective effect within a few milliseconds and at least partially eliminates the problems described at the outset.

BRIEF SUMMARY OF THE INVENTION

The present invention provides an emergency braking system for abruptly braking a revolving shaft of a machine tool, the emergency braking system having a brake drum and at least one brake shoe which are engaged with one another in order to brake the shaft. According to the present invention, the brake drum and the at least one brake shoe are designed and configured in such a way that the braking engagement between the brake drum and the brake shoe takes place under the influence of the centrifugal force or centrifugal acceleration resulting from the rotation of the shaft. Accordingly, the present invention is directed to the deceleration of the revolving shaft of the machine tool, which may be a circular table saw, a compound miter saw, or a miter saw, for example, by making use of the rotational energy present on the revolving shaft, with the aid of the design of a self-amplifying or self-locking friction pairing. The specified time period of the braking, which is in the range of a few milliseconds, may be ensured in this way.

The triggering of the braking operation, which takes place, for example, as a response to an output signal of a sensor which detects a hazardous situation for the user, may occur by mechanical, electromechanical, pyrotechnic, pneumatic, or hydraulic means, and in principle is not limited to any given medium, although electromechanical triggering is preferred due to a simple design and very good reversibility.

According to one embodiment of the present invention, the at least one brake shoe is pivotably mounted on a brake shoe carrier which is situated on the revolving shaft and rotates with same. A locking device is preferably provided, which may be moved between a locked position, in which the brake shoe is held against the brake shoe carrier, and an unlocked position in which the at least one brake shoe is released in such a way that it undergoes a swivel motion toward the brake drum in order to bring about the braking intervention. In other words, the at least one brake shoe which rotates with the revolving shaft is abruptly moved toward the stationary brake drum within a few milliseconds, making use of the centrifugal force of the revolving shaft, as soon as the locking device is transferred to its unlocked position.

The locking device preferably includes at least one blocking element which may be moved between a locked position, in which it is engaged with the at least one brake shoe, and an unlocked position in which it is decoupled from the brake shoe. Such a blocking element may be designed, for example, as locking pins, or the like.

The locking device advantageously includes an actuator which transfers the locking device from the locked position to the unlocked position. This actuator may, for example, be a magnetic actuator which attracts a ring armature to which a blocking element in the form of a locking pin is fastened in order to disengage the locking pins from the brake shoe so that the brake shoe is released.

The emergency braking system also preferably includes a coupling device which is constructed in such a way that in its coupled position it connects the shaft to be braked to a drive train, and during an emergency braking operation is automatically transferred to its decoupled position in which the drive shaft to be braked is decoupled from the drive train. Such a decoupling of the drive train during an emergency braking operation ensures that the drive train, which may have a drive shaft and possibly transmission stages, for example, is excluded from the actual braking operation, as the result of which the drive train is not subjected to the high deceleration torques which occur during the braking operation. This has the advantage that, on the one hand, it not possible for components of the drive train to be damaged due to the braking operation. On the other hand, the geometries of the drive-side components do not have to be adapted to the requirements of the braking operation, and therefore may be manufactured with a more robust design and in a more cost-effective manner. In addition, this results in a beneficial reduction in the mass moment of inertia to be decelerated, since the components of the drive train do not have to be braked. The system load during the deceleration phase may thus be significantly reduced. Similarly, for the same action of force the time required for the braking operation of the saw blade may be greatly shortened. Alternatively, of course, the action of force may be reduced without a change in the braking time.

According to one example embodiment, the shaft to be braked is designed as a hollow shaft, in the cavity of which a drive shaft of the drive train is positioned. The coupling device is advantageously formed by a projection which is provided on the at least one brake shoe, and which in the coupled position engages through a through opening provided in the shaft to be braked and into a recess in the drive shaft, so that the drive shaft and the shaft to be braked are connected to one another in a rotationally fixed manner, and in the decoupled position the projection is disengaged from the recess in the drive shaft so that the shaft to be braked is no longer driven by the drive shaft. In this way the drive train may be decoupled during the braking operation. The projection preferably engages with the recess in a positive-fit manner, thus achieving a secure engagement of the projection in the recess. For this purpose the projection may be curved, for example, and the recess may have a prismatic shape.

At this point it is noted that the number of projections does not have to correspond to the number of recesses. Thus, for example, four recesses and only two projections may be provided. This is advantageous in that, after the emergency braking system is triggered, the drive shaft need be rotated only slightly in order to once again situate the projections in a pair of recesses. In addition, more than two brake shoes may be provided, only two of which, however, must be affixed to the drive shaft via appropriate connections formed from a projection and a recess.

The emergency braking system according to the present invention also preferably has a reset device for moving the at least one brake shoe back to its starting position in order to ensure full system reversibility after a braking operation has taken place. The reset device has a design which is closely tuned to the self-amplification of the friction pairing, and thus to the geometry of the braking system. The reset device may be implemented, for example, by using appropriately sized tension spring elements as well as compression spring elements.

Moreover, the present invention relates to a machine tool having an emergency braking system of the type previously described, whereby the machine tool may preferably be a circular saw, more precisely a circular table saw, a compound miter saw, or a miter saw.

However, the braking system according to the present invention may also be applied to other machine tools which in a specific event rely on a deceleration which may be triggered in a targeted manner within a given time period in the range of a few milliseconds. The present invention may be adapted to a different machine tool in the individual case.

DETAILED DESCRIPTION OF THE INVENTION

Figure 1:
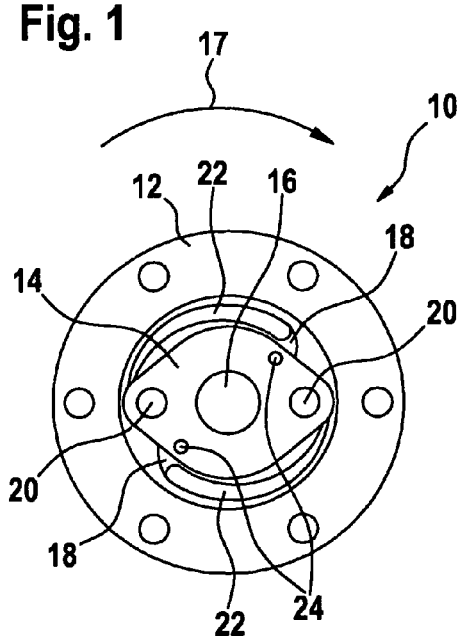
FIG. 1 shows a schematic front view of an emergency braking system according to one embodiment of the present invention, in a state in which the braking operation has not been triggered.
Figure 2:
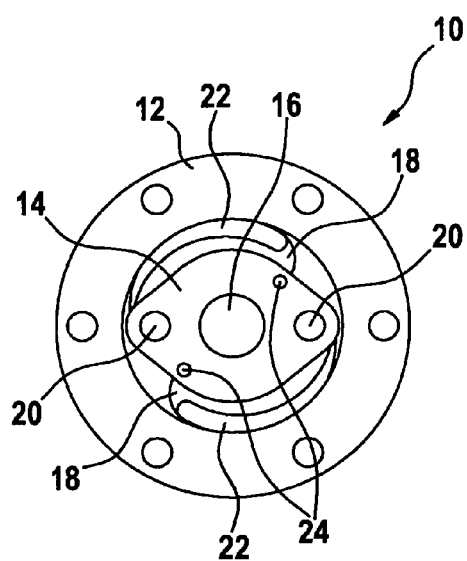
FIG. 2 shows a schematic front view of the emergency braking system illustrated in FIG. 1, in a state in which the braking operation has been triggered.

FIGS. 1 through 6 show schematic views of an emergency braking system according to one embodiment of the present invention, which is denoted overall by reference numeral 10 and which is used, for example, to bring a saw blade of a circular table saw (not shown) which is in a hazardous situation to a standstill within a very short time period in the range of a few milliseconds. Emergency braking system 10 includes a stationary brake drum 12 which is fastened to a frame component (not illustrated in greater detail) of a circular table saw. This frame component must be designed in such a way that it withstands and is able to absorb braking torques generated during the deceleration phase. Emergency braking system 10 also includes a brake shoe carrier 14, which is fixedly connected to an output shaft 16 on the saw blade side in such a way that the brake shoe carrier revolves together with the output shaft in the rotational direction denoted by arrow 17. Two diametrically opposed brake shoes 18 are fastened to brake shoe carrier 14, each being rotatably mounted about a swivel pin 20. Brake shoes 18 are each provided with a friction lining 22 on their surface facing brake drum 12, these friction linings 22 engaging with stationary brake drum 12 during a braking operation of emergency braking system 10, so that friction linings 22 and brake drum 12 form a friction pairing. In the state illustrated in FIG. 1 in which the braking operation has not yet been triggered, brake shoes 18 are fixedly held against brake shoe carrier 14 with the aid of locking pins 24, so that the brake shoes are not able to rotate about swivel pins 20.

Figure 3:
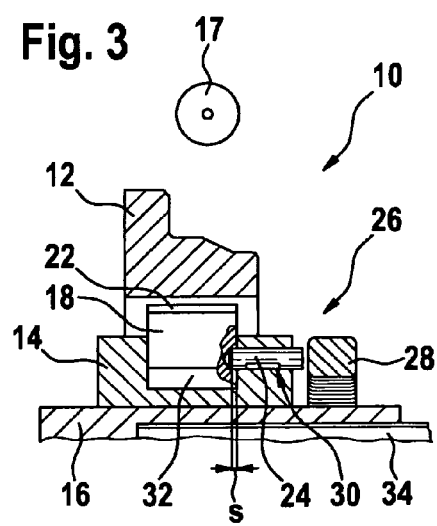
FIG. 3 shows a longitudinal sectional view of the emergency braking system illustrated in FIGS. 1 and 2, in a state in which the braking operation has not been triggered.

These locking pins 24 are part of locking device 26, which also has a magnetic actuator 28 via which locking pins 24 may be moved between a locked position, in which brake shoes 18 are held against brake shoe carrier 14, and an unlocked position in which brake shoes 18 are released in such a way that they undergo a swivel motion about their swivel pins 20 in the direction of brake drum 12 in order to bring about the braking intervention between friction linings 22 and brake drum 12. As shown in FIG. 3, magnetic actuator 28 of locking device 26 is fixedly attached to output shaft 16. Alternatively, magnetic actuator 28 may be fastened to a stationary housing part (not illustrated) and may act on locking pins 24 in a contactless manner. Locking pins 24, which may be moved back and forth by magnetic actuator 28, extend through through openings 30 provided in brake shoe carrier 14, and in the state illustrated in FIGS. 1, 3, and 5, in which the braking operation has not yet been initiated, engage in engagement openings 32 provided in each of brake shoes 18. Brake shoes 18 are locked to brake shoe carrier 14 in this way. When the braking system is triggered, magnetic actuator 28 pulls a ring armature, to which locking pins 24 are fastened, by a defined disengagement path s from brake shoe carrier 14, thus releasing brake shoes 18 (see FIG. 4). The brake shoes rest against stationary brake drum 12 as a result of the centrifugal forces or the centrifugal acceleration generated by revolving output shaft 16, thus forming the friction pairing between friction linings 22 of brake shoes 18 and brake drum 12 which is necessary for decelerating output shaft 16. Even if locking pins 24 are moved back and forth with the aid of magnetic actuator 28 in the present exemplary embodiment, it is noted that locking pins 24 may alternatively be moved in one of the two directions of motion under the action of an elastic force or the like. Thus, locking pins 24 may move forward under the influence of magnetic actuator 28, while locking pins 24 are reset by one or multiple spring elements, or vice versa.

As a function of the geometric dimensions of the design, an amplifying factor C' thereof is defined, which for the present design must be in the range of the self-amplification or the self-locking of the system. For this case, only a brief pulse is required for forming the friction pairing, since brake shoes 18 are pressed against brake drum 12 due to the force equilibrium which occurs.

Figure 4:
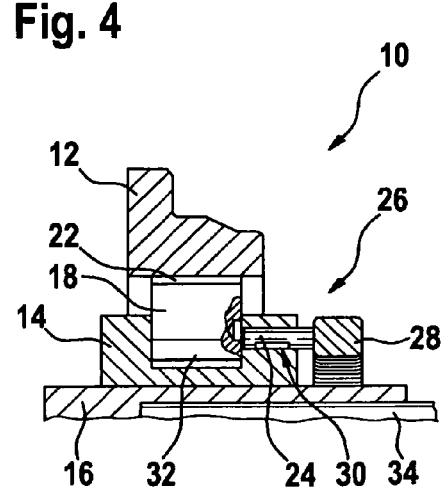
FIG. 4 shows a schematic longitudinal sectional view of the emergency braking system illustrated in FIGS. 1 through 3, in a state in which the braking operation has been triggered.
Figure 5:
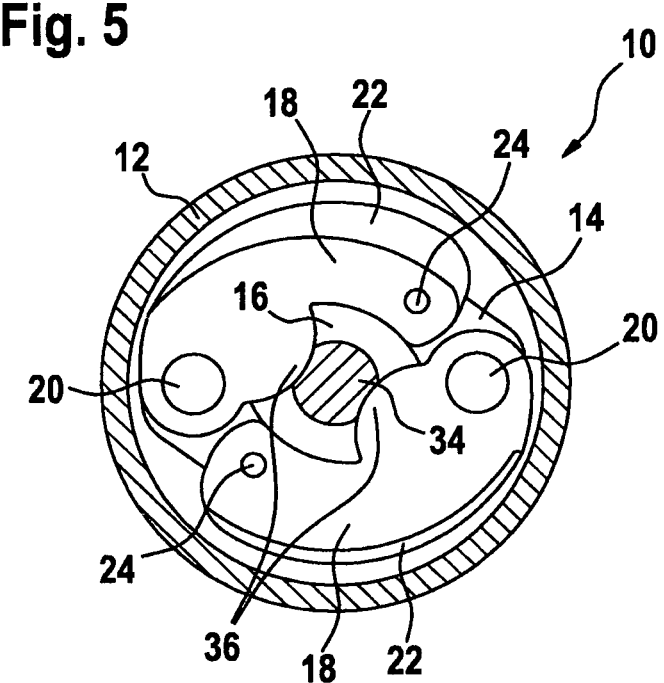
FIG. 5 shows a schematic cross-sectional view of the emergency braking system illustrated in FIGS. 1 through 4, in a state in which the braking operation has not been triggered.
Figure 6:
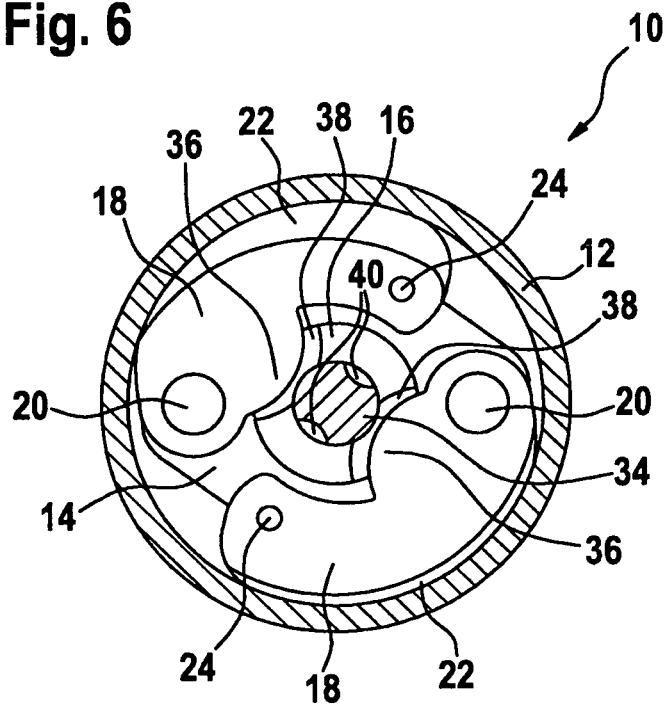
FIG. 6 shows a schematic cross-sectional view of the emergency braking system illustrated in FIG. 1 through 5, in a state in which the braking operation has been triggered.

As shown in particular in FIGS. 3 and 4, output shaft 16 to be braked with the aid of emergency braking system 10 is designed as a hollow shaft, in the cavity of which a drive shaft 34 is accommodated which forms a part of the drive train (not illustrated in greater detail). In order to connect output shaft 16 and drive shaft 34 to one another in a rotationally fixed manner, curved projections 36 which protrude in the direction of the midpoint of output shaft 16 and drive shaft 34 are provided on brake shoes 18, and each of the projections passes through through openings 38 provided in output shaft 16 and engages with prism-shaped recesses 40 in drive shaft 34, as illustrated in FIG. 5. Output shaft 16 and drive shaft 34 are connected to one another in a rotationally fixed manner as a result of the engagement of projections 36, provided on brake shoes 18, with corresponding recesses 40 in drive shaft 34. When the braking operation is initiated, starting from the state illustrated in FIG. 5, after locking pins 24 have been pulled by disengagement path s from brake shoes 18, brake shoes 18 rotate about their respective swivel pins 20 in the direction of brake drum 12, so that projections 36 situated on brake shoes 18 are disengaged from associated recesses 40 in drive shaft 34, thus decoupling drive shaft 34 from output shaft 16. As a result of this decoupling, the drive train is not subjected to the deceleration torques generated during the braking operation, and therefore is not able to suffer damage. It is also possible for the components of the drive train to have a less robust design, since they are not subjected to large loads during the braking operation. Thus, for example, the cross section of engine-side drive shaft 34 may be designed to be smaller than in the case in which no decoupling device is provided for decoupling the drive train. However, the resulting advantage, that the number of components to be decelerated is reduced to a minimum, is crucial. This has a positive effect on the system load during the deceleration phase, as previously described.

The time interval for the triggering time of the braking operation may be greatly shortened due to the previously described design of emergency braking system 10, since the braking intervention between brake drum 12 and brake shoes 18 takes place under the influence of the centrifugal force or centrifugal acceleration resulting from the rotation of output shaft 16. The enabling of the required response times in the range of a few milliseconds could be demonstrated in principle by computations.

Furthermore, the design illustrated in FIGS. 1 through 6 achieves an electromechanical system without using additional forms of energy, which under some circumstances would jeopardize full reversibility and represent a limitation for same.

Due to the use of a two-sided action of the peripheral friction force on the friction pairing, the roller bearings used in the present case are spared, and need not be modified or even redesigned in the interest of durability of the overall system, which in turn would introduce increased mass inertia into the system.

As the result of a design as previously described, revolving external geometries of the brake unit are also avoided, thus allowing implementation of an easily encapsulated, closed system having a compact design which also integrates well into the special concerns of occupational safety in the use of machine tools.

Magnetic actuator 28 is actuated by output signals of appropriate sensors which detect a state in which an operator is approaching dangerously close to the saw blade of the circular table saw. Such sensors are known in the related art, and therefore are not described in greater detail in the present description.

Even if a circular table saw has been selected as an example of a machine tool in the previously described specific embodiment, it should be self-evident that the principle of the present invention may also be applied to other machine tools.

Lastly, the previously described embodiment of the emergency braking system according to the present invention is in no way limiting. Rather, modifications and revisions are possible without departing from the scope of protection of the present invention.

What is claimed is:

1. An emergency braking system for braking a revolving shaft of a machine tool for protecting a user of the machine tool, comprising:
    a brake drum;
    a brake shoe carrier connected to the shaft; and
    at least one brake shoe pivotably connected to the brake shoe carrier; and
    a locking pin extending through an opening in the brake shoe carrier and switchable between a locked position, in which the locking pin extends through the opening in the brake shoe carrier and engages with an opening in the at least one brake shoe to fixedly hold the brake shoe against the brake shoe carrier as the shaft is rotated, and an unlocked position, in which the locking pin is disengaged from the opening in the at least one brake shoe to release the brake shoe from the brake shoe carrier and engage the brake shoe with the brake drum in order to stop the shaft within 50 ms under the influence of a centrifugal force resulting from the rotation of the shaft.

2. The emergency braking system as recited in claim 1, wherein the locking device has an actuator configured to switch the locking device from the locked position to the unlocked position.

3. The emergency braking system as recited in claim 1, further comprising:
    a coupling device, wherein in a coupled position the coupling device connects the shaft to a drive train, and wherein during an emergency braking operation the coupling device is configured to be automatically switched to a decoupled position in which the drive shaft is decoupled from the drive train.

4. The emergency braking system as recited in claim 3, wherein:
    the shaft is configured as a hollow shaft;
    a drive shaft of the drive train is positioned in the hollow shaft;
    the coupling device is formed by at least one projection provided on the at least one brake shoe, and in the coupled position the projection engages through a through opening in the shaft of the machine tool and into a recess in the drive shaft such that the drive shaft and the shaft of the machine tool are connected to one another in a rotationally fixed manner, and in the decoupled position the projection is disengaged from the recess in the drive shaft so that the shaft of the machine tool is not driven by the drive shaft.

5. The emergency braking system as recited in claim 4, wherein the projection engages with the recess in a positive-fit manner.

6. The emergency braking system as recited in claim 4, further comprising:
    a reset device configured to move the at least one brake shoe back to original starting position.

7. The emergency braking system as recited in claim 6, wherein the reset device has at least one spring element.

8. The emergency braking system as recited in claim 6, wherein the machine tool is a circular saw.

* * * * *

UNITED STATES PATENT AND TRADEMARK OFFICE
CERTIFICATE OF CORRECTION

PATENT NO.       : 8,677,870 B2  
APPLICATION NO.  : 12/736228  
DATED            : March 25, 2014  
INVENTOR(S)      : Thomas Winkler Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 85 days.

Signed and Sealed this

Twenty-ninth Day of September, 2015

Michelle K. Lee
*Director of the United States Patent and Trademark Office*